Sept. 5, 1961        H. RIESELER        2,998,698
SUPERCHARGED INTERNAL COMBUSTION ENGINE WITH CONTROLS THEREFOR
Filed May 20, 1955        3 Sheets-Sheet 1

INVENTOR

HERMANN RIESELER, DECEASED,
BY HELENE RIESELER, HEIR

*Patent Agent*

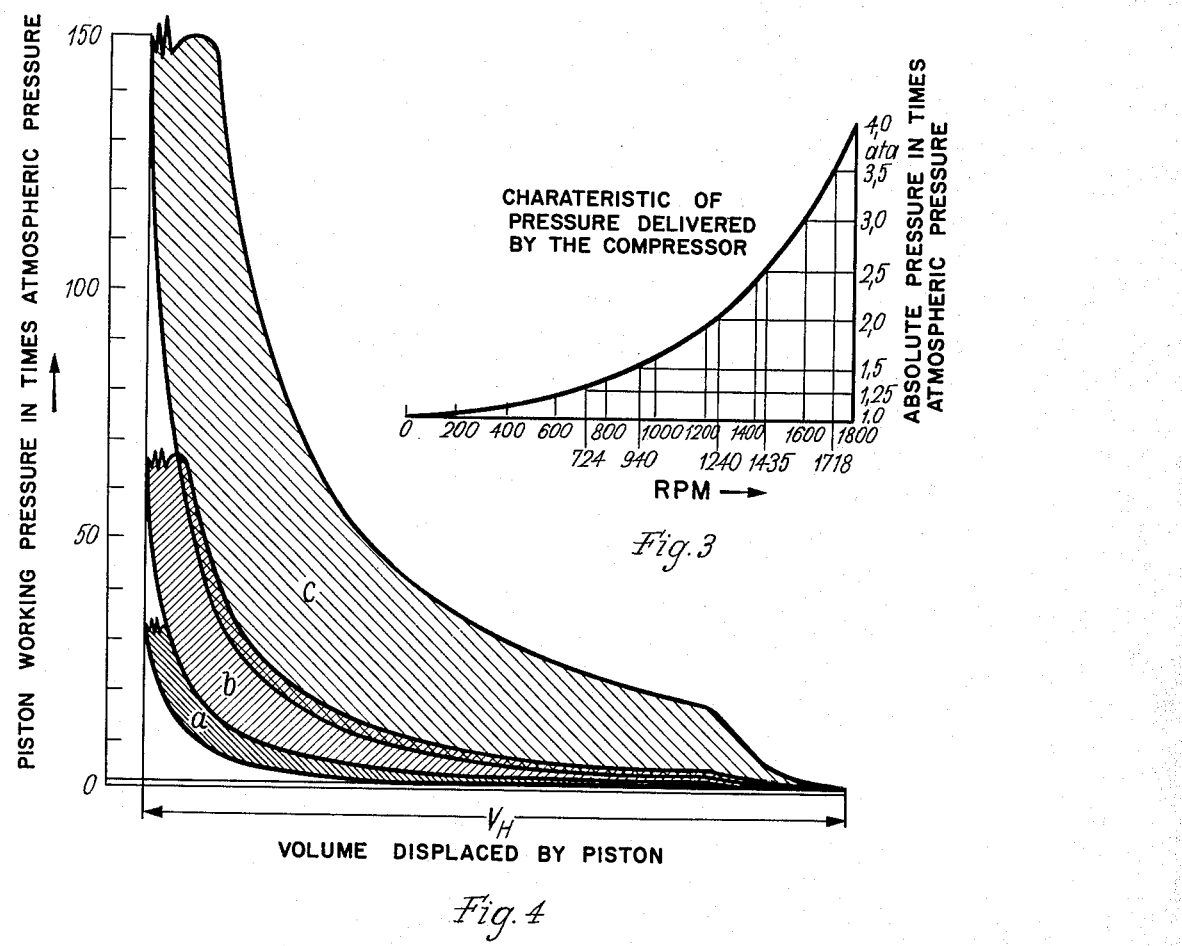

SPEED REALIZABLE WITH THE AVAILABLE TORQUE

United States Patent Office 2,998,698
Patented Sept. 5, 1961

2,998,698
SUPERCHARGED INTERNAL COMBUSTION
ENGINE WITH CONTROLS THEREFOR
Hermann Rieseler, deceased, late of Giesenstrasse 43,
Neidlingen (Teck), Germany, by Helene Rieseler, neé
Scherber, heir, Neidlingen (Teck), Germany
Filed May 20, 1955, Ser. No. 509,966
7 Claims. (Cl. 60—13)

The present invention relates to an internal combustion engine and, more particularly concerns a high efficiency internal combustion piston engine the torque of which may be varied and increased to such an extent that, when employing such an engine, a separate torque converter or change gear transmission may in most instances be unnecessary.

Internal combustion engines are known the combustion chambers of which receive air under high pressure which has been compressed by a compressor and is preheated by exhaust heat. Engines of this type have the advantage that the drive motor, for instance of rail motor vehicles, is first started with hot air and can start under load, and subsequently, when operating in a combustion process, can work at constant output within a wide speed range. These engines, however, require a rather complicated construction due to the fact that control means for controlling the loading, driving means for said control means, and a rather big four-step high pressure piston compressor system with a plurality of intermediate cooling devices will be necessary.

It is, therefore, an object of the present invention to provide a highly flexible internal combustion engine which will overcome the above mentioned drawbacks while maintaining the advantages of the above mentioned installations.

It is another object of this invention to provide a highly flexible internal combustion engine which while not requiring control means for controlling the loading nor a high pressure compression system with intermediate cooling means nor a high pressure preheating device, will make it possible to operate within a wide speed range and to obtain a power output which is a multiple of the power output of a non-supercharged diesel engine of substantially the same weight and same size.

These and other objects and advantages of the invention will appear more clearly from the following specification in connection with the accompanying drawings, in which:

FIG. 1 diagrammatically illustrates an engine system according to the invention for driving a motor vehicle.

FIG. 2 is a diagrammatic illustration of the driving system, while FIG. 2a is a section along 2a—2a of FIG. 2.

FIG. 3 is a graph showing the characteristic of the pressure of a three-step centrifugal compressor.

FIG. 4 is a pressure-volume diagram showing the limitations of the output of the disclosed power plant.

General arrangement

Figure 1:
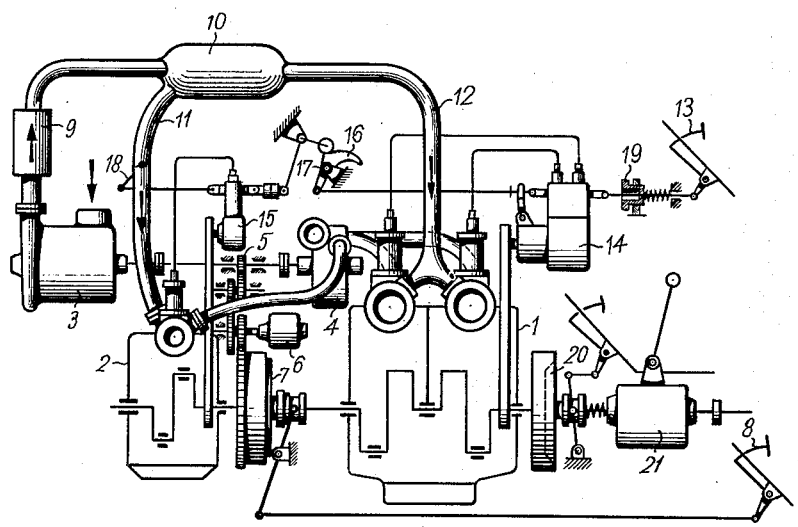

According to the present invention the solution to the problem outlined above consists in the control of the charge by infinitely varying the magnitude of the scavenging and charging air pressure up to approximately 4 atmospheres absolute in combination with the employment of a special motor working process while will make it possible, also with a two-sstroke cycle diesel engine, to carry out the combustion with low air excess, with unusually low ignition delay, at unusually high compression end pressures up to approximately 150 atmospheres absolute and at especially high combustion pressures and temperatures.

The essence of the invention consists in that in addition to providing a two-stroke cycle internal combustion engine which delivers the useful work and is supercharged according to the new combustion method, there is provided a multi-step small centrifugal compressor of high speed, which continuously and in an infinitely variable manner, will deliver scavenging and charging air which is varied as to pressure and quantity in conformity with the greatly varying load in the operation of the vehicle. This centrifugal compressor is driven by a separate supercharged two-stroke cycle small internal combustion engine working according to the same combustion method and supplied with scavenging and charging air by the same centrifugal compressor. The said centrifugal compressor is furthermore driven by an exhaust gas turbine fed with exhaust gas energy from said two internal combustion engines.

The power control of the internal combustion engine furnishing the useful work is effected in cooperation with a change in the quantity of fuel fed to said engine. More specifically, the speed of the separately driven machine, for instance of the turbine, or of the auxiliary piston engine or of both, is changed with regard to the speed of the turbocompressor. To this end, there is effected a change in the pressure and the quantity of the delivered charging air brought about by the change in the speed of said separately driven engine. The characteristic of the power intake of the centrifugal blower which varies from that of piston-actuated compressors brings about a reduction in the delay of the control action, which reduction is particularly desirable when operating a vehicle. This reduction in the delay of the controlling operation is due to the fact that the charging pressure does not increase proportionally but with the fourth power of the speed of the compressor. The desired quick increase in the speed of the centrifugal compressor is brought about by a temporary increase in the cross section of the conduit leading to the auxiliary motor for driving the centrifugal compressor and conveying the scavenging and charging air. This air conduit is therefore, provided with a throttle which is operatively connected or coupled with a control member of the fuel pump for the main motor. The auxiliary motor driving the centrifugal compressor and the exhaust gas turbine is, therefore, normally operated at a somewhat throttled air supply and at a correspondingly lower charging air pressure. Since this throttling is temporarily reduced or eliminated with each increase in the fuel supply to the main engine due to the above mentioned coupling or operative connection between said throttle and said control member, the speed of the auxiliary motor increases, and both engines, already prior to reaching the smoke limit, obtain a higher weight of air corresponding to the increased fuel supply. This arrangement makes it possible that a high power reserve is instantaneously available which is particularly desirable in connection with the operation of motor vehicles so that the rather voluminous heretofore customary reservoir for compressed air becomes superfluous.

For purposes of infinitely variably adapting the output of the blower to the requirement of air of the main motor, which requirement varies with the load, the control member of the fuel pump for the auxiliary motor is either directly or through an auxiliary control member operatively connected or coupled to the control member of the fuel pump for the main motor.

For starting the main motor and for absorbing the power during a braking operation while the vehicle equipped with the power plant according to the invention is driving downhill, there is provided a band clutch which is self-intensifying and temporarily connects the crank shaft of the two motors.

Structural arrangement

Figures 2, 2A:
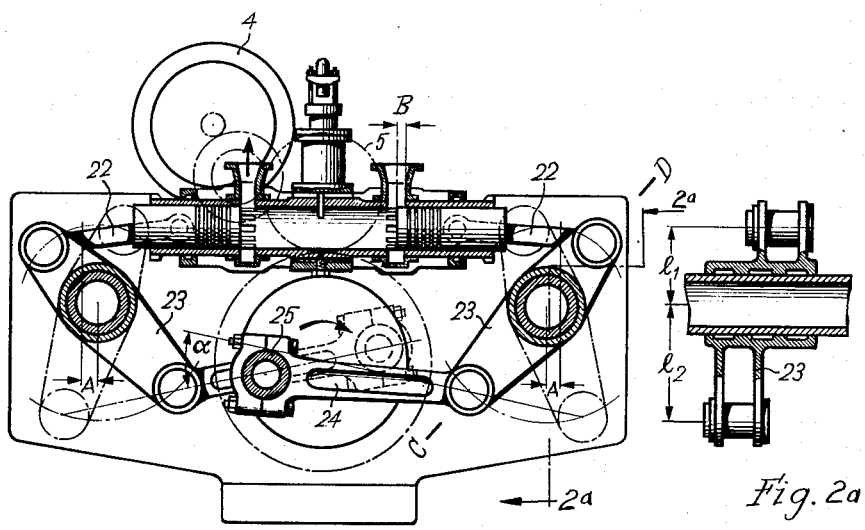

Referring now to the drawings in detail and FIGS. 1, 2 and 2a thereof in particular, the arrangement diagrammatically shown therein comprises the main motor 1 furnishing the useful work and designed as two-cylinder motor with counter running pistons. The arrangement furthermore comprises an auxiliary motor 2 which is designed as single-cylinder motor with counter running pistons. The arrangement shown in the drawings furthermore comprises a multiple stage centrifugal compressor 3 and an exhaust gas turbine 4 actuated by the exhaust gases of the main motor 1 and auxiliary motor 2. The compressor 3 and turbine 4 are drivingly connected to the auxiliary motor 2 by means of the transmission 5. The small auxiliary motor 2 can be started either manually or by means of a starter and generator 6 connected to the transmission 5. A friction clutch 7 serves temporarily to connect the auxiliary motor with the main motor. The friction clutch 7 is actuated by means of a braking lever 8 when starting the main motor by means of the auxiliary motor, and also when braking. In order to save the friction brakes of the motor vehicle, the actuation of the clutch 7 is preferably effected during the advance stroke of the braking lever 8. Due to the temporary coupling of the crank shaft of the main motor with the crank shaft of the auxiliary motor and with the centrifugal blower 3, the power input of said blower which greatly increases with the speed is taken advantage of for obtaining a braking effect which will properly vary in conformity with the respective driving speed.

The air under pressure delivered by the blower 3 passes through the cooler 9 into a container 10. The scavenging and charging ports of the two motors 2 and 1 are by means of short pipes 11 and 12 connected to the container 10.

The control member of the fuel pump 14 for the main motor 1, which control member is actuated by a pedal 13 may be coupled with the control member of the fuel pump 15 for the auxiliary motor 2 either directly or through the intervention of an adjustable intermediate member 16. The intermediate member 16 consists primarily of a control segment which is adjustably mounted on its pivot 17. In order to be able to effect a change in the delivery of air during the operation by changing the speed of the auxiliary motor, the adjustment of the control segment 16 on pivot 17 may be effected by a further control member.

A throttle 18 is arranged in the scavenging and charging air conduit 11 which leads to the auxiliary motor 2. The throttle 18 is adapted to be actuated by the pedal 13. As long as pedal 13 is not actuated, the linkage system abuts the abutment 19, and the two fuel pumps 14 and 15, and also the throttle 18 occupy their idling position. When the auxiliary motor is started by the starter 6 or is manually cranked, it will already during its first rotations receive the scavenging and charging air quantity necessary for idling, said air being delivered by the blower 3 drivingly connected to the auxiliary motor 2.

For purposes of starting the main motor, first the auxiliary motor 2 is accelerated by actuation of the pedal 13 as a result of which the fuel quantity delivered by the fuel pump 15 is increased while the throttle 18 is opened further so that scavenging and charging air is throttled to a less extent. The control rod of the fuel pump 14 for the main motor has been moved by the pedal 13 into the position necessary for the starting of the main motor. The scavenging and charging air in front of the inlet ports of the cylinders of the main motor is ready to pass through said ports. The driving clutch 20 is, as usual, in its engaged position. The change and reversing transmission 21 occupies its neutral position. It should be noted that generally the said transmission 21 for the disclosed power plant, in addition to the backward and the direct speed, requires a starting and climbing speed only for use during the starting and when climbing inclines of more than about 10%. By exerting pressure upon the braking lever 8, clutch 7 will temporarily be engaged. The cranking of the main motor brought about as a result thereof is effectively aided by the stored energy in the centrifugal compressor 3, the exhaust gas turbine 4 and in the rotating masses. At the same time the main motor is being cranked, the fuel pump 14 therefor starts its delivery. The highly compressed motor starts after a few rotations and now, similar to the auxiliary motor, idles until the vehicle in customary manner after disengaging the clutch 20, throwing in the starting speed of the transmission 21, releasing the clutch pedal 20, and actuation of the pedal 13, begins its movement and is accelerated in conformity with the available unusually high motor torque.

After the main motor starts, the clutch 7 is again disengaged. With clutch 7 in disengaged position, the auxiliary motor can speed up relative to the main motor and as a result the compressor driven by the auxiliary motor furnishes charging air to the main motor at increased pressure so that the power output of the main motor increases quickly.

When the vehicle is braked the clutch is again engaged by actuation of the braking lever 8 whereby the vehicle will drive the auxiliary motor 2 and the compressor 3 and will this be braked.

Inasmuch as the two internal combustion engines in conformity with the new combustion method according to the invention, at full load operate at unusually high compression end pressures of about 150 atmospheres absolute and almost equally high combustion maximum pressures, relatively small piston diameters and correspondingly small piston sliding surfaces are required. This fact in cooperation with high piston pressures for avoiding too high specific piston surface pressures, brings about that the piston force, as is for instance customary in connection with motors having counter running pistons (also see FIG. 2), is conveyed to the connecting rod 24 and crank 25 while the lateral piston pressures and the piston friction are greatly reduced. The piston force is conveyed to the connecting rod 24 and crank 25 by means of a connecting rod 22 and an oscillating lever 23. With both internal combustion engines of the disclosed power plant, the arrangement of counter running piston makes possible to employ the simplest type of good uniflow scavenging and furthermore makes it possible to supercharge the motor without additional control members.

The oscillating levers 23 are journalled at points which deviate from the vertical lines which bisect the arcs of travel of the upper ends of the levers by the distance A. This arrangement makes it possible that the angle of inclination of the connecting rods 22 relative to the cylinder axis is small when the pistons are in their inner position and at which time high pressures prevail in the cylinder. As a result of this location of the journalling of the oscillating levers, and due to the employment of unequal lever arm lengths $l_1$ and $l_2$ of the oscillating levers 23 (FIG. 2a), the piston lateral pressures, the piston friction, and the load on the bearings for the oscillating lever and connecting rods are kept low. At the same time, there is obtained, on account of the piston being slightly out of phase, as will be seen in FIG. 2, the lag B of the working piston relative to the other piston for controlling the inlet which lag is necessary in order to allow the post-charging and supercharging without the employment of valves. This lag can be measured by the crank angle alpha. The said working piston pertains to the motor with counter running pistons and provided with cranks offset to each other by 180°. This advantage is made possible while the overall height of the motor installation is low. Inasmuch as the disclosed power plant works as a two-stroke cycle engine, the fact that its driving parts have a higher weight is advantageous inasmuch as the increased inertia effect of the driving mechanism reduces the top loads of several bearing pivots, thereby improving the rotative power graph of the machine, i.e. improves the uniformity of its circumferential force.

In FIG. 3, the delivery pressures of a three-step centrifugal compressor 3 are plotted as based on a 400 horsepower drive for a vehicle. In this diagram, absolute pressure in times atmospheric pressure, atmospheres absolute, is shown plotted against r.p.m. The characteristic of the power input of the centrifugal compressor improves the starting of the auxiliary motor which together with the exhaust gas turbine 4 (FIG. 1) drives said compressor. On the other hand, the blower pressure which quickly increases within the second half of the speed range of the auxiliary motor and the blower reduces the delay in the control action when the output of the main motor increases.

FIGURE 4, shows indictor diagrams or pressure-volume characteristics of the main engine under three different operating conditions. This diagram shows piston-working pressure in atmospheres absolute plotted against the volume displaced by the piston. Such indicator cards are known and are of a conventional nature.

In FIG. 4, line $a$ which is the loop enclosing the shaded region in which the letter $a$ is placed is the indicator diagram for the main engine running idle. The line $b$, which is the loop enclosing the shaded portion in which the letter $b$ is placed is the indicator diagram for the engine when it is running under full load conditions at about 100 H.P. output. This would move a truck of about 20,000 kilograms over a level surface.

The line $c$, in which is the loop enclosing the shaded area in which the letter $c$ is placed is the indicator diagram for the main engine when it is operating according to the method of the present invention and is being supercharged and is delivering about 400 H.P.

The main engine may be considered to have a compression ratio of about 15.1 and a dead space magnitude of about 5.15% of the cylinder-piston displacement.

When the main engine is operating according to indicator diagram $c$, there is a charging pressure of about 3½ atmospheres absolute and a pressure in the cylinder at the end of the compression stroke of up to nearly the main combustion pressure of 150 atmospheres absolute. The mean indicated pressure with reference to indicator diagram $c$ amounts to about 29 to 31 atmospheres absolute.

With reference to line $b$ of FIGURE 4, this shows the indicator diagram when the engine moving a truck with a total weight of about 20,000 kilograms on the level at a speed of about 42 miles per hour. As mentioned, the motor develops about 100 H.P. instead of the 400 H.P. that is produced when the engine is operating according to indicator diagram $c$. For line $b$, the scavaging and charging pressure amounts to about 1.25 atmospheres absolute. This requires a pressure at the discharge side of the compressor of about 1.5 atmospheres absolute.

Reference to FIG. 3 will show that the auxiliary motor driven compressor will only have to rotate at about 940 r.p.m to give a compressor discharge pressure of 1.5 atmospheres absolute, for operation of the main motor according to line 6, whereas the main motor will, in driving the truck at around 42 miles per hour, run within the range of its maximum speed.

If it should be desired to increase the output of the main motor over what is provided for according to the line $b$ of FIG. 4, as, for example, for acceleration or for hill climbing, the speed of the auxiliary motor is increased thus increasing the discharge pressure of the compressor. This pressure can be increased up to a maximum of about 4 atmospheres absolute at the discharge side of the compressor which will provide for charging air pressure on the order of 3½ atmospheres absolute at the cylinder of the main engine as was referred to in connection with line $c$ of FIG. 4.

It has been found by test and experiment with one cylinder test motors running according to the present invention, that the mean useful working pressure of the main motor, with the charging pressure at about 3½ atmospheres absolute, is on the order of about 26 to 28 kilograms or square centimeter. These tests thus show that for an engine with a maximum power output of 400 H.P. a total piston displacement of only about 5.2 liters is required and that the complete power plant can be constructed and arranged within the volume and weight limits of a modern non-supercharged diesel vehicle engine of about 110 H.P.

Figure 5:
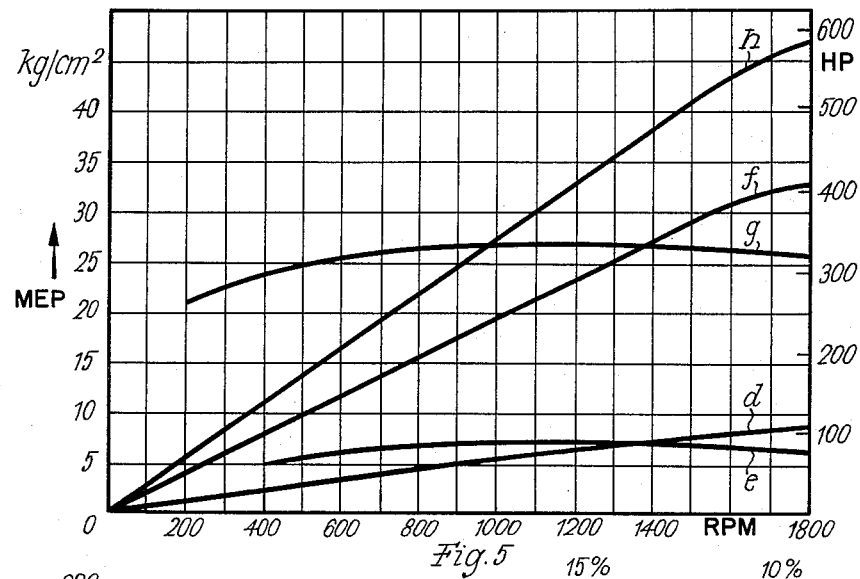
FIG. 5 illustrates the increase in power obtainable by the present invention over a non-supercharged diesel engine.

In FIGURE 5 the mean effective pressure, M.E.P., and power, H.P., of the main engine are plotted against the engine speed in r.p.m. In this figure, line $d$ indicates the power of a conventional diesel engine of a given size and weight without supercharging; line $f$ indicates main engine power of a power plant of about the same size and weight according to this invention with supercharging; line $e$ indicates the mean useful piston working pressure of the conventional engine; and line $g$ indicates the mean useful piston working pressure of the supercharged main engine.

The power for driving the centrifugal compressor 3 about half of which power is furnished by the auxiliary motor 2 while about the other half is furnished by the exhaust gas turbine 4 (FIG. 1), is evident from the difference in level between the line $f$ indicating the useful power output of the main motor and the line $h$ indicating the useful power output of the main motor when supercharged according to the invention.

Figure 6:
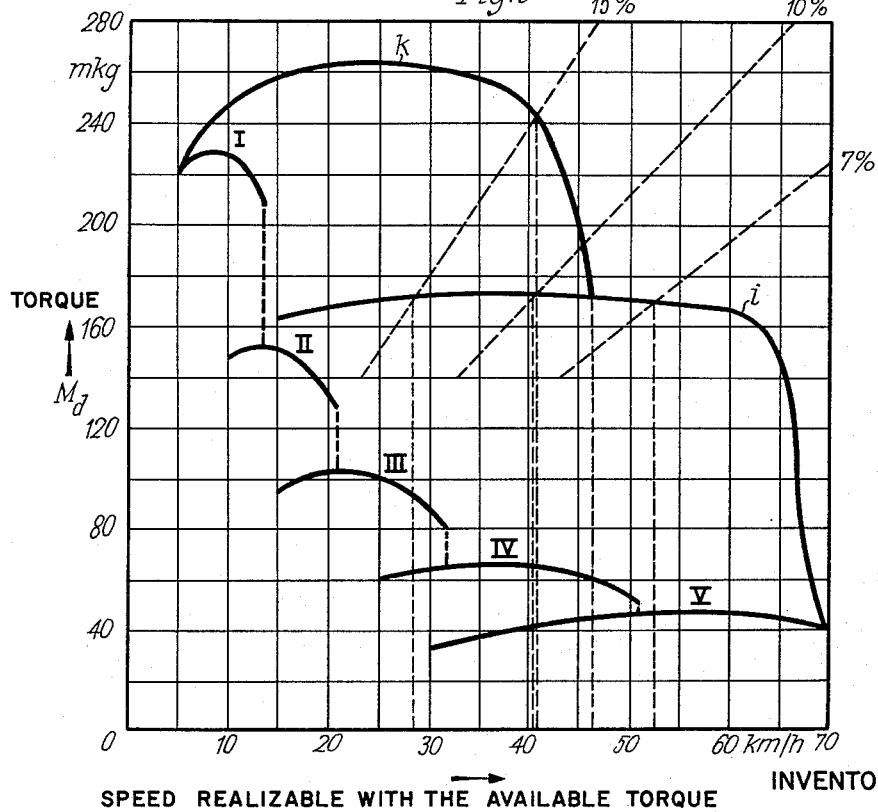
FIG. 6 shows the course of the torque of the main engine over a non-supercharged vehicle diesel engine of the same weight and size with a five-speed transmission.

FIG. 6 shows characteristics of the torque of a non-supercharged vehicle diesel engine of 110 H.P. maximum power with a five-speed transmission in comparison to the characteristics of the torque of the main motor according to the invention at the same speed. In this figure, main engine torque, indicated by $M_d$, is plotted against driving speed. Torques available from the unsupercharged engine are shown for an engine in a vehicle having five speeds, I, II, III, IV and V. Torques needed for various inclines of the road are shown at 7 percent, 10 percent and 15 percent, respectively. Torques available from a supercharged engine in a vehicle having a two-speed gear is denoted by $i$ for direct gear and $k$, second gear. The line $i$ shows the torque excess of the main motor available for acceleration and for quickly overcoming hills, while the main motor is operating in direct speed. The line $i$ furthermore shows that when employing the disclosed power plant, three speeds or speed ranges of a five-speed transmission can be eliminated so that a motor vehicle having the disclosed power plant drive can get along with only a starting speed in addition to the direct speed. If, for said starting speed and special speed for hills, a transmission ratio of 1:1.5 is selected, it is possible with the corresponding higher torque $k$ of the disclosed power plant to maintain the high acceleration of the heretofore high transmission ratio of the first speed up to about 28 m.p.h. whereas heretofore with a conventional non-supercharged engine it could be maintained only up to a speed of about 9 m.p.h. The heavy truck selected as an example for describing the present invention and assumed to be equipped with an engine of 400 H.P. maximum output and furthermore assumed to have a total weight of 20,000 kilograms will take any hills up to a 7% inclination at a speed of approximately 52 kilometers per hour. If the starting and hill velocity range or speed is not made effective, the driving speed in direct gear will, at an increase of the inclination up to 10%, drop down to approximately 40 kilometers per hour, and when driving over a long hill of an inclination of approximately 15%, will drop down to a speed of approximately 27 kilometers per hour. If during the increase in the inclination while the speed of the truck has dropped down to 46 kilometers per hour, the hill speed or hill velocity range is made effective, the driving speed will, over a long inclination of 15%, drop down to approximately 42 kilometers per hour only.

The disclosed power plant according to the invention which is characterized by an ever-ready reserve in power output is thus highly flexible and therefore makes possible a considerable decrease in the average driving speed of heavy trucks with a corresponding increase in the economy of such trucks, especially in hilly or mountainous regions.

While in the description of the particular embodiment shown in the drawing, the auxiliary motor represents a two-stroke cycle internal combustion engine, it is to be understood that the invention is not limited to the employment of this particular type of auxiliary motor but that also any other type of engine may be employed for this purpose which draws air from the compressor and furnishes its gases to the turbine. It may also be mentioned that the invention is not limited to the employment of a multiple stage compressor but that also other compressors as for instance a single stage compressor may be employed as long as it furnishes the desired high pressure.

It is, of course, understood that the present invention is, by no means, limited to the particular construction and arrangement shown in the drawings but also comprises any modifications within the scope of the appended claims.

What is claimed is:

1. In combination with a main internal combustion engine having an air inlet and an exhaust gas outlet and also comprising a fuel injection pump and control means for controlling said pump: auxiliary internal combustion motor means having an air inlet and an exhaust gas outlet, fuel injection pump means associated with said auxiliary motor means for supplying fuel thereto, intermediate lever means interposed between and interconnecting said fuel pump and said fuel pump means, said lever means being adjustable to vary the output of said main internal combustion engine in conformity with the output of said auxiliary internal combustion motor means, high pressure compressor means, conduit means connecting said compressor means with the air inlet of said main internal combustion engine and of said auxiliary motor means to furnish air under high pressure thereto, an exhaust gas turbine, conduit means effecting communication between the exhaust gas outlet of said main internal combustion engine and of said auxiliary motor means with said turbine for conveying actuating exhaust gases to said turbine, and means drivingly connecting said auxiliary motor means and said turbine with said compressor for conveying driving power to said compressor means.

2. An arrangement according to claim 1, in which said lever means includes a control segment, and pivot means supporting said control segment, said segment being adjustable on said pivot means.

3. In combination with a main internal combustion engine having an air inlet and an exhaust gas outlet: auxiliary internal combustion motor means having an air inlet and an exhaust gas outlet, high pressure compressor means, conduit means connecting said compressor means with the air inlet of said main internal combustion engine and of said auxiliary motor means to furnish air under high pressure thereto, an exhaust gas turbine, conduit means effecting communication between the exhaust gas outlet of said main internal combustion engine and of said auxiliary combustion engine with said gas turbine to convey exhaust gases from said main internal combustion engine and said auxiliary motor means to said turbine for actuating the same, means drivingly connecting said auxiliary motor means and said turbine with said compressor means for conveying driving power to said compressor means, and coupling means for drivingly connecting said compressor means with said main internal combustion engine for braking the latter.

4. In combination with a main internal combustion engine having cranks and an air inlet and an exhaust gas outlet: auxiliary internal combustion motor means having an air inlet and an exhaust gas outlet, high pressure compressor means, conduit means connecting said compressor means with the air inlets of said main internal combustion engine and said auxiliary motor to furnish air under high pressure thereto, an exhaust gas turbine, conduit means effecting communication between the exhaust gas outlets of said main internal combustion engine and of said auxiliary motor means with said turbine for conveying actuating exhaust gases to said turbine, and means drivingly connecting said auxiliary motor means and said turbine with said compressor means for conevying driving power to said compressor means, said main internal combustion engine being provided with counter running pistons, and which comprises means for asymmetrically setting said pistons and conveying power from said pistons to said cranks, said cranks being offset with regard to each other by 180 degrees, said engine and motor having independent fuel supply means, and a single element movable for adjusting both of said fuel supply means simultaneously.

5. In combination with a main internal combustion engine having cranks and an air inlet and an exhaust gas outlet: auxiliary internal combustion motor means having an air inlet and an exhaust gas outlet, high pressure compressor means, conduit means connecting said compressor means with the air inlets of said main internal combustion engine and said auxiliary motor to furnish air under high pressure thereto, an exhaust gas turbine, conduit means effecting communication between the exhaust gas outlets of said main internal combustion engine and of said auxiliary motor means with said turbine for conveying actuating exhaust gases to said turbine, and means drivingly connecting said auxiliary motor means and said turbine with said compressor means for conveying driving power to said compressor means, said main internal combustion engine being provided with counter running pistons, and which comprises means for asymmetrically setting said pistons and conveying power from said pistons to said cranks, said cranks being offset with regard to each other by 180 degrees, said means for asymmetrically setting said pistons including links pivotally connected to said counter running pistons, oscillating lever means with arms of different lengths and with asymmetrically located pivots respectively pivotally connecting one end of each of said oscillating lever means with the respective adjacent link, said means for asymmetrically setting said pistons also including connecting rods connecting the other end of said oscillating lever means to said cranks, said engine and motor having independent fuel supply means, and a single element movable for adjusting both of said fuel supply means simultaneously.

6. In combination with a main internal combustion engine having cranks and an air inlet and an exhaust gas outlet: auxiliary internal combustion motor means having an air inlet and an exhaust gas outlet, high pressure compressor means, conduit means connecting said compressor means with the air inlets of said main internal combustion engine and said auxiliary motor to furnish air under high pressure thereto, an exhaust gas turbine, conduit means effecting communication between the gas outlets of said main internal combustion engine and of said auxiliary motor means with said turbine for conveying actuating exhaust gases to said turbine, and means drivingly connecting said auxiliary motor means and said turbine with said compressor means for conveying driving power to said compressor means, said auxiliary motor means being provided with counter running pistons, and which comprises means for asymmetrically setting said pistons, said engine and motor having independent fuel supply means, and a single element movable for adjusting both of said fuel supply means simultaneously.

7. In combination with a main internal combustion engine having cranks and an air inlet and an exhaust gas oulet: auxiliary internal combustion motor means having an air inlet and an exhaust gas outlet, high pressure compressor means, conduit means connecting said compressor means with the air inlet of said main internal combustion engine and said auxiliary motor to furnish air under high pressure thereto, an exhaust gas turbine, conduit means effecting communication between the exhaust gas outlet of said main internal combustion engine and of said auxiliary motor means with said turbine for conveying actuating exhaust gases to said turbine, means drivingly connecting said auxiliary motor means and said turbine with said compressor means for conveying driving power to said compressor means, individual fuel pump means for said motor means and engine, and linkage means interconnecting said fuel pump means for simultaneous adjustment thereof.

References Cited in the file of this patent

UNITED STATES PATENTS

| | | |
|---|---|---|
| 2,322,522 | Johansson | June 22, 1943 |
| 2,357,031 | Stabler | Aug. 29, 1944 |
| 2,388,756 | Meyers | Nov. 13, 1945 |
| 2,465,099 | Johnson | Mar. 22, 1949 |
| 2,516,911 | Reggio | Aug. 1, 1950 |
| 2,585,029 | Nettel | Feb. 12, 1952 |
| 2,628,607 | Newell | Feb. 17, 1953 |

FOREIGN PATENTS

| | | |
|---|---|---|
| 849,935 | Germany | Sept. 18, 1952 |